(12) United States Patent
Kelly et al.

(10) Patent No.: US 11,433,331 B2
(45) Date of Patent: Sep. 6, 2022

(54) SYSTEM AND METHOD FOR ENGINEERED CERAMIC PACKAGES FOR USE IN FLUID TREATMENT TECHNOLOGIES

(71) Applicant: Lawrence Livermore National Security, LLC, Livermore, CA (US)

(72) Inventors: James Patrick Kelly, San Francisco, CA (US); Jeffery J. Haslam, Livermore, CA (US); Mark Mitchell, Dublin, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 69 days.

(21) Appl. No.: 16/799,493

(22) Filed: Feb. 24, 2020

(65) Prior Publication Data

US 2020/0222839 A1    Jul. 16, 2020

Related U.S. Application Data (63) Continuation of application No. 16/739,830, filed on Jan. 10, 2020.
(Continued)

(51) Int. Cl.
| | |
|---|---|
| *B01D 15/10* | (2006.01) |
| *B01D 24/10* | (2006.01) |
| *B01D 39/06* | (2006.01) |
| *B01D 46/24* | (2006.01) |
| *B01J 35/06* | (2006.01) |

(Continued)

(52) U.S. Cl.
CPC ............ *B01D 39/06* (2013.01); *B01D 15/10* (2013.01); *B01D 24/10* (2013.01); *B01D 46/2455* (2013.01); *B01D 71/024* (2013.01); *B01J 35/06* (2013.01); *B01J 35/1076* (2013.01); *B01J 37/0009* (2013.01); *B01J 37/342* (2013.01);
(Continued)

(58) Field of Classification Search
CPC ........ B01D 39/06; B01D 15/10; B01D 24/10; B01D 71/024; B01D 46/24; B01D 46/2455; B01J 35/06; B01J 35/1076; B01J 37/0009; B01J 37/342; D01D 5/003; D01D 5/0076; D10B 2505/04
See application file for complete search history.

(56) References Cited

U.S. PATENT DOCUMENTS

| | | | |
|---|---|---|---|
| 3,983,021 A | 9/1976 | Henis | |
| 5,149,475 A * | 9/1992 | Horikawa | ............... B28B 3/269 |
| | | | 156/89.22 |

(Continued)

OTHER PUBLICATIONS

AAF Flanders "Alpha Cell" (PPT), Product Specfication, (2017) 2.
(Continued)

*Primary Examiner* — Benjamin L Lebron
(74) *Attorney, Agent, or Firm* — Harness, Dickey & Pierce, P.L.C.

(57) ABSTRACT

The present disclosure relates to a modular fluid modification system having an outer container configured to permit a fluid flow there into at a first location, and to allow the fluid flow to exit the container at a second location spaced apart from the first location. A plurality of fluid contacting elements is housed in the outer container. The fluid contacting elements each form an independent filtering or reactor element. Each fluid contacting element includes a plurality of openings formed in a grid or lattice-like pattern.

19 Claims, 7 Drawing Sheets

Related U.S. Application Data (60) Provisional application No. 62/791,652, filed on Jan. 11, 2019.

(51) Int. Cl.

| | | |
|---|---|---|
| *B01J 35/10* | (2006.01) | |
| *B01D 71/02* | (2006.01) | |
| *B01J 37/00* | (2006.01) | |
| *B01J 37/34* | (2006.01) | |
| *D01D 5/00* | (2006.01) | |

(52) U.S. Cl.
CPC .......... *D01D 5/003* (2013.01); *D01D 5/0076* (2013.01); *D10B 2505/04* (2013.01)

(56) References Cited

U.S. PATENT DOCUMENTS

| | | | |
|---|---|---|---|
| 8,414,806 B2 | 4/2013 | Sun et al. | |
| 8,979,968 B2 | 3/2015 | Haslam | |
| 9,017,458 B2 | 4/2015 | Mitchell et al. | |
| 2002/0076372 A1* | 6/2002 | Leloup ................ | F01N 3/28 422/222 |
| 2004/0128991 A1* | 7/2004 | Sakamoto ............ | B01D 46/247 60/299 |
| 2004/0219084 A1 | 11/2004 | Hall et al. | |
| 2005/0266992 A1* | 12/2005 | Ohno ................... | C04B 35/6263 502/439 |
| 2008/0176013 A1* | 7/2008 | Ohno .................... | F01N 3/0215 428/34.1 |
| 2009/0041635 A1* | 2/2009 | Berkey ............... | B01D 53/9481 422/177 |
| 2009/0221047 A1 | 9/2009 | Schindler et al. | |
| 2010/0056816 A1 | 3/2010 | Wallin et al. | |
| 2010/0233812 A1 | 9/2010 | Sun et al. | |
| 2011/0052467 A1 | 3/2011 | Chase et al. | |
| 2012/0102902 A1* | 5/2012 | Gallagher ............ | B01D 46/106 55/484 |
| 2013/0048579 A1* | 2/2013 | Haslam ................ | B82Y 30/00 210/808 |

OTHER PUBLICATIONS

Ahmed, Farah Ejaz, Boor Singh Lalia, and Raed Hashaikeh. "A review on electrospinning for membrane fabrication: challenges and applications." Desalination 356 (2015): 15-30.
Barhate, Rajendrakumar Suresh, and Seeram Ramakrishna. "Nanofibrous filtering media: filtration problems and solutions from tiny materials." Journal of membrane science 296.1-2 (2007): 1-8.
Benito, J. M., et al. "Preparation and characterization of tubular ceramic membranes for treatment of oil emulsions." *Journal of the European Ceramic Society* 25.11 (2005): 1895-1903.
Bhardwaj, Nandana, and Subhas C. Kundu. "Electrospinning: a fascinating fiber fabrication technique." Biotechnology advances 28.3 (2010): 325-347.
Bhushani, J. Anu, and Chinnaswamy Anandharamakrishnan. "Electrospinning and electrospraying techniques: Potential food based applications." Trends in Food Science & Technology 38.1 (2014): 21-33.
Camfil "Filter for High Temperature" (PPT), Product Specification, (2016), 1.
Camfil "Termikfil Absolute: High-Temperature HEPA Filter" (PPT), Product Specification, (2018), 1.
Chang, Guoqing, et al. "Formation and self-assembly of 3D nanofibrous networks based on oppositely charged jets." *Materials & Design* 97 (2016): 126-130.
Chigome, Samuel, Godfred Darko, and Nelson Torto. "Electrospun nanofibers as sorbent material for solid phase extraction." Analyst 136.14 (2011): 2879-2889.
Dalton, Paul D., et al. "Electrospinning and additive manufacturing: converging technologies." Biomaterials Science 1.2 (2013): 171-185.

Deakin, Lynne. "Biopharmaceuticals: Scalable, disposable filtration systems address market challenges." *Filtration+ Separation* 48.2 (2011): 20-22.
Dou, Binlin, et al. "Research Progress of Hot Gas Filtration, Desulfurization and HCl Removal in CoalDerived Fuel Gas." *ChemInform* 44.34 (2013).
Finley, John. "Hot gas filtration: diesel-how prepared is the filtration industry?." Filtration & separation 43.4 (2006): 16-20.
Flanders "FFI Nuclear Grade HEPA Filters." (PPT), Product Report, (2017), 28.
Hammel, Emily Catherine, OL-R. Ighodaro, and O. I. Okoli. "Processing and properties of advanced porous ceramics: An application based review." *Ceramics International* 40.10 (2014): 15351-15370.
Heidenreich, Steffen, and Bernd Scheibner. "Hot gas filtration with ceramic filters: Experiences and new developments." *Filtration & separation* 39.4 (2002): 22-25.
Homaeigohar, Shahin, and Mady Elbahri. "Nanocomposite electrospun nanofiber membranes for environmental remediation." *Materials* 7.2 (2014): 1017-1045.
Huang, Yunpeng, Yue-E. Miao, and Tianxi Liu. "Electrospun fibrous membranes for efficient heavy metal removal." Journal of Applied Polymer Science 131.19 (2014).
IAEA "Treatment of Radioactive Gaseous Waste" (PPT), Report, (2014), 66.
Kumar, Palaniswamy Suresh, et al. "Hierarchical electrospun nanofibers for energy harvesting, production and environmental remediation." *Energy & environmental science* 7.10 (2014): 3192-3222.
Lalia, Boor Singh, et al. "A review on membrane fabrication: Structure, properties and performance relationship." Desalination 326 (2013): 77-95.
Luo, C. J., et al. "Electrospinning versus fibre production methods: from specifics to technological convergence." Chemical Society Reviews 41.13 (2012): 4708-4735.
Mao, Xue, et al. "Flexible and highly temperature resistant polynanocrystalline zirconia nanofibrous membranes designed for air filtration." Journal of the American Ceramic Society 99.8 (2016): 2760-2768.
McIlvaine, M. W. "Market for hot gas filtration." *Filtration & separation* 35.8 (1998): 809-811.
McIlvaine, R. W. "Air and liquid filtration markets in 2000." *Filtration & separation* 36.7 (1999): 34-36.
Pall Corp/Millipore Corp "Biotechnology as an end market for filtration & separation" Filtration + Separation 39.2 (2002): 32-34.
Panthi, Gopal, et al. "Electrospun ZnO hybrid nanofibers for photodegradation of wastewater containing organic dyes: A review." Journal of Industrial and Engineering Chemistry 21 (2015): 26-35.
Persano, Luana, et al. "Industrial upscaling of electrospinning and applications of polymer nanofibers: a review." *Macromolecular Materials and Engineering* 298.5 (2013): 504-520.
Ramakrishna, Seeram, et al. "Electrospun nanofibers: solving global issues." Materials today 9.3 (2006): 40-50.
Ramaseshan, Ramakrishnan, et al. "Nanostructured ceramics by electrospinning." Journal of Applied Physics 102.11 (2007): 7.
Shutov, A. A., and E. Yu Astakhov. "Formation of fibrous filtering membranes by electrospinning." *Technical physics* 51.8 (2006): 1093-1096.
Stitzel, Joel, et al. "Controlled fabrication of a biological vascular substitute" Biomaterials 27.7 (2006): 1088-1094.
Sun, B., et al. "Advances in three-dimensional nanofibrous macrostructures via electrospinning." Progress in Polymer Science 39.5 (2014): 862-890.
Sutherland, Ken. "The European market for filtration equipment" *Filtration + Separation*, 48.2 (2011) 32-35.
Sutherland, Ken. "Gas filtration: Market driving forces in gaseous filtration." *Filtration+ Separation* 48.4 (2011): 12-16.
Teo, W. E., et al. "Porous tubular structures with controlled fibre orientation using a modified electrospinning method." *Nanotechnology* 16.6 (2005): 918.
Teo, Wee E., and Seeram Ramakrishna. "A review on electrospinning design and nanofibre assemblies." Nanotechnology 17.14 (2006): R89.

(56) References Cited

OTHER PUBLICATIONS

Teo, Wee-Eong, Ryuji Inai, and Seeram Ramakrishna. "Technological advances in electrospinning of nanofibers." *Science and technology of advanced materials* (2019).

Thavasi, V., G. Singh, and S. Ramakrishna. "Electrospun nanofibers in energy and environmental applications." Energy & Environmental Science 1.2 (2008): 205-221.

Vacura, Karen. "Filtration industry overview: World pharma and biotechnology market 2008." Filtration & Separation 45.8 (2008): 22-24.

Verbruggen, Sammy W., et al. "Harvesting hydrogen gas from air pollutants with an unbiased gas phase photoelectrochemical cell." *ChemSusChem* 10.7 (2017): 1413-1418.

Zhou, Feng Lei, Rong Hua Gong, and Isaac Porat. "Mass production of nanofibre assemblies by electrostatic spinning." *Polymer International* 58.4 (2009): 331-342.

\* cited by examiner

SYSTEM AND METHOD FOR ENGINEERED CERAMIC PACKAGES FOR USE IN FLUID TREATMENT TECHNOLOGIES

CROSS-REFERENCE TO RELATED APPLICATIONS

This application is a continuation and claims priority to U.S. patent application Ser. No. 16/739,830, filed Jan. 10, 2020, which claims the benefit of U.S. Provisional Application No. 62/791,652, filed on Jan. 11, 2019. The entire disclosures of each of the above applications are incorporated herein by reference.

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to a ceramic package for treating different types of fluids, and more particularly to fluid modification systems (e.g., filtering and/or reactor systems) for treating fluids, liquids or gases, which make use of fully or partially formed media elements, for example tubular media, with the media having a nanofibrous or nanoporous construction and prepared by methods such as electrospinning, extrusion, casting, or additive manufacturing. These methods allow for the variation of micro-porosity and macro-porosity in addition to the nanostructure for improving performance.

BACKGROUND

This section provides background information related to the present disclosure which is not necessarily prior art.

The advantage and application of polymer nanofibrous structures, including 3D structures, is rapidly accelerating as the technology to fabricate and collect nanofibers improves. However, there has always been a lag, and slower pace, in ceramic nanofiber development because of additional challenges. There are shrinkage and potential embrittlement challenges associated with the thermal treatments required to convert pre-ceramic precursors into ceramic. These challenges have proven to be a barrier to the development of larger membranes suitable for many present-day applications.

There are several well-known prior art technologies for treating liquids and gases. The simplest method is mixing additives into the fluid using batch or flow reactors. Another method is to use a filter pack through which fluid flows and interacts with the media inside the filter pack. A first type of media that can be used is a packed particle bed. One specific type of packed particle bed is activated carbon particles commonly used for portable and household water purification, as one example. The performance of a filter pack with particle media depends on the size of the particles used. This is because there is a trade-off between particle surface area that the fluid gets exposed to and the pressure drop of the fluid flowing through the filter pack. Porous particles help mitigate the effects of this trade off.

The second type of media used in filter packs comprises closely-spaced parallel membranes or channels. In this case, the fluid is exposed to the media by cross-flow or flow over the membrane surface rather than through the membrane. Cross-flow reduces the pressure drop compared to permeating through the membrane. Catalytic converters used to remove toxic pollutants from the hot exhaust gases of automobiles into inert gases are one example of a gas treatment technology that utilizes cross-flow to treat a fluid. The exhaust gas flow in the channels of a ceramic monolith with a honeycomb structure and the channels are coated with ceramic particles that support and stabilize the precious metal catalyst that converts the pollutant into inert gas.

Traditional High Efficiency Particulate Air (HEPA) filtration is an air treatment technology for removing aerosol particles from an air stream. HEPA filters can remove 99.97% of particles that are 0.3 µm or larger. HEPA filters can therefore remove dust, allergens, and airborne bacteria and viral organisms, and thus are especially useful for ventilation and particulate removal from air or gas streams. In a nuclear setting, HEPA filters are invaluable in preventing the release and spread of radioactive particulates.

HEPA filters are typically made with non-woven polymer or glass microfibers formed into a large sheet, which forms a filter media. The large sheet of filter media is corrugated and sealed in a filter housing to increase the surface area of the sheet in the filter without compromising the oncoming airflow. The increased surface area of the media relative to the cross-sectional area of the fluid flow stream reduces pressure drop, just like cross flow methodology described above, except that the gas must still pass through the filter media since there is no path through the filter other than through the corrugated filter media. Oncoming particulates thus flow with the air through the filter media. The fibrous nature of the polymer or glass microfibers ensnares some of the particles as they move about a "torturous path." HEPA filters are limited to use at relatively low temperatures because components, e.g., binders and the polymeric or fiberglass media degrades at elevated temperatures.

With HEPA filters there are at least three distinct methods by which particles are transported and interact with the glass fibers. The first method is impaction, which is typical of large particles that cannot follow the curving contours of the air flow. These particles travel on a straight path and collide with a fiber directly without following the quick turns performed by the airflow. This effect increases as for larger particles, smaller fiber separations, and higher flow velocities.

The second method is interception, which is where particles flowing along the air flow come into contact with a fiber. This occurs when distance between the airflow and the surface of the fiber is smaller than the radius of the particle. The third method is diffusion which is especially common with extremely small particles. This occurs due to how microscopic particles interact with the nearby molecules. Their movements are defined by Brownian motion or random erratic movements of microscopic particles in a fluid due to particle interactions. While these microscopic particles follow the air flow, their random zig-zagging movement increases the distance that the particles travel which increases the probability that these particles are stopped by impaction or interception.

Porous ceramic candles form another filtration method. They may be packed in a parallel array for use in hot gas treatment and have some of the same beneficial features of traditional HEPA filters. The candles are tubes sealed on one end so that the gas must flow through the wall of the candle. The tubes are long to maximize the surface area and minimize pressure drop. The pressure drop is further reduced if the tube wall microstructure is microfibrous instead of partially sintered particles. The candle wall structure is sometimes an asymmetric membrane that improves the properties of the candle. An asymmetric membrane has a thick support that provides the candle with sufficient strength and supports a thin, high-performance membrane. Keeping the high-performance membrane thin is essential for minimizing pressure drop, and thus to maximize efficiency.

Ceramic whiskers or needles have also been embedded into non-woven microfiber filter media to improve performance of the media. A prior art arrangement involving the direct deposition of non-woven nanofibers directly onto current air filters by electrospinning to supplement filtration works well for polymer nanofibers, but does not work for most ceramic nanofibers because of the thermal treatment that is required, associated shrinkage, and lack of thermal stability of current air filters.

Another known method of concurrently filtering particles and collecting gases describes a filtration system where a functionalized coating or membrane is applied to open-ended ceramic tubes that are capped and sealed in a filter assembly, but also does not work for ceramic nanofibers prepared directly from electrospinning because of the thermal treatment, associated shrinkage, and potential embrittlement of the membrane.

At least one patent, U.S. 2010/0233812 A1, involves the synthesis of titania ceramic membranes using a hydrothermal synthesis process. The process is similar to methods of making paper: fibers are dispersed in a solution to make a pulp followed by vacuum filtration of the pulp to form a cake on a porous substrate, which is then dried and then heat treated. A macro-scale tube was prepared by this method as an example of a shape that could be made, without describing or demonstrating the utility of such a tube. The scale of the tube is also not addressed.

SUMMARY

This section provides a general summary of the disclosure, and is not a comprehensive disclosure of its full scope or all of its features.

In one aspect the present disclosure relates to a modular fluid modification system. The system may comprise an outer container configured to permit a fluid flow there into at a first location and to allow the fluid flow to exit the container at a second location spaced apart from the first location. A plurality of fluid contacting elements, each forming an independent filtering or reactor element, is housed adjacent one another in the container. Each fluid contacting element includes a plurality of openings formed in a grid or lattice-like pattern.

In another aspect the present disclosure relates to a modular fluid modification system. The system may comprise a tubular outer container, impervious to a fluid flow, and configured to permit the fluid flow into the tubular outer container at a first location and to allow the fluid flow to exit the tubular outer container at a second location spaced apart from the first location. A plurality of fluid contacting elements may be included which each form an independent filtering or reactor element, and which are each housed adjacent one another in the container. Each fluid contacting element includes an outer frame portion within which is included a plurality of wall portions, the wall portions defining a plurality of openings arranged in a grid or lattice-like pattern. At least a subplurality of the wall portions is at least one of nanoporous in construction or microporous in construction. The outer container and each one of the fluid contacting elements further include cooperating structure to hold each fluid contacting element in a desired angular position within the outer container such that each adjacent pair of fluid contacting elements are angularly offset from one another by a predetermined degree.

In still another aspect the present disclosure relates to a method of performing fluid modification. The method may comprise initially providing an outer container configured to permit a fluid flow there into at a first location and to allow the fluid flow to exit the container at a second location spaced apart from the first location. The method may further comprise using a plurality of fluid contacting elements each forming an independent filtering or reactor element, and housed adjacent one another in the outer container, to form a modular fluid modification assembly to receive and pass the fluid flow therethrough as the fluid flows from the first location to the second location. The fluid flows through a plurality of wall portions of each fluid contacting element and through a plurality of openings formed by the plurality of wall portions of each fluid contacting element. The wall portions are formed by at least one of nanofibrous or nanoporous materials in an ordered grid or lattice-like pattern.

Further areas of applicability will become apparent from the description provided herein. It should be understood that the description and specific examples are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. Corresponding reference numerals indicate corresponding parts throughout the several views of the drawings, in which.

DETAILED DESCRIPTION

Example embodiments will now be described more fully with reference to the accompanying drawings.

The present system and method relates broadly to a system having randomly orientated nanofibrous or nanoporous mini-structures or mini-elements that enable flow both through and along the wall structures of the element. Merely for convenience, these mini-structures or mini-elements will be referred to in the following discussion as "mini-tubes." In one embodiment the mini-tubes have a toroidal or tubular construction, and each having a nanofibrous or nanoporous microstructure and that can be prepared by methods such as electrospinning, extrusion, casting, and/or additive manufacturing (e.g., 3D printing). It will be appreciated, however, that while the following discussion refers to "mini-tubes", "toroidal mini-tubes" or other shapes for the mini-tube media, the mini-tubes do not have to be perfectly formed tubes. The mini-tubular media, or tube, can be toroidal or virtually any other shape and does not have to be a fully formed tube or a fully closed tube. Still further, while a "tube" or "tubular" structure may be generally understood as having a length which is greater than its cross-sectional dimension, and with a centrally located opening extending through its entire length, the mini-tubes of the present disclosure are not so limited. The term "mini-tube" as used herein is intended to encompass structures with length/cross-sectional ratios more like a doughnut, but which still provide an internal flow path through at least a portion of the overall length, as well as permitting flow through a wall structure thereof. The internal flow path need not be perfectly linear, but could form a tortuous path, and may extend fully through the entire length of the mini-tube, or may extend through only a portion of the overall length of the mini-tube. The various embodiments of the mini-tube as described herein may be formed with a spiral configuration, as a spiral, star, hexagonal, as a doughnut, as a corrugated element, or even as a gyroid element (e.g., a triply periodic minimal surface structure), or with virtually any other shape. Alternative shapes can be intentionally used to impart a desired macro porosity in addition to the nanofibrous or nanoporous microstructure. Likewise, the microstructure can include microporosity in the microstructure in addition to the nanofibrous or nanoporous microstructure construction. Also, while random orientations of the mini-tube elements are discussed herein, non-random or ordered orientations and assemblies of the mini-tube elements are just as possible as well, along with possibly a mixture of ordered and randomly orientated mini-tube elements.

Figure 1:
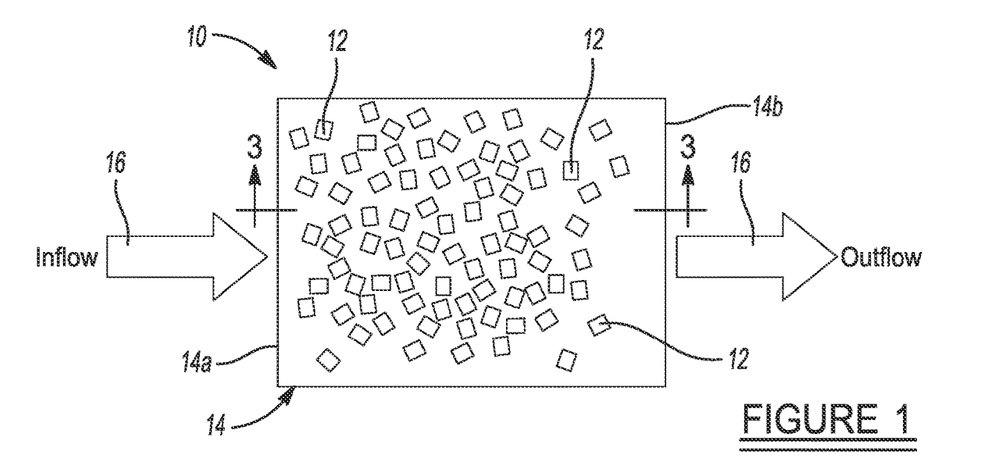
FIG. 1 is an illustration of one embodiment of a mini-tubular media construction with a nanofibrous or nanoporous microstructure prepared by electrospinning, extrusion, casting, and/or additive manufacturing (e.g., 3D printing) in accordance with one embodiment of the present disclosure, which may be used to construct a fluid modification pack (pack), hereafter referred to as the "filter pack," in accordance with one embodiment of the present disclosure.

Referring to FIG. 1, one embodiment of a fluid modification system 10 forming a pack in accordance with the present disclosure is shown. While the fluid modification system 10 may be used in applications for performing fluid treatment and/or fluid filtering operations, as will become more apparent from the following discussion, for convenience the system 10 will be referred to hereinafter simply as "the filter pack" 10, with it being appreciated that the functionality of the filter pack 10 is not restricted only to filtration applications.

It will also be appreciated that the term "fluid" as used in the following discussion may encompass any flowable medium, for example liquids or gases, including and without limitation air, gases, mixtures of non-air gases and air, water, petroleum, oil, chemical feedstock, drugs, etc. Moreover, the fluids could be radioactive, hazardous, or valuable fluids or contain radioactive, hazardous, or valuable materials. The fluid modification capable of being performed by the various embodiments and methods described herein may involve changing the physical, chemical or any other properties and characteristics of the fluid as it flows through the filter pack 10. Such changes may be by filtration, size selection or segregation or discrimination, thermal treatment, chemical treatment, (e.g., catalytic reaction), adsorption, absorption, "physisorption", "chemisorption", and adding or subtracting material (e.g., particles or chemicals) to the flow stream. As such, the fluid modification media discussed herein can be adapted to perform any of one or more fluid processing methods such as, without limitation, particulate filters (e.g., HEPA, ceramic, clean room, sub-HEPA or process filters), and also to perform fluid treatment using reactive or catalytic materials.

The filter pack 10 may include a plurality of mini-tubes 12 randomly orientated in a suitable container structure 14. The mini-tubes 12 are preferably made from ceramic, and are sufficient in number such that they preferably fill the container structure 14 while being arranged in random orientations within the container. As such, a fluid flow 16 that enters the filter pack 10 will flow 1) through at least a subplurality of the porous, mini-tube wall structure 12a, shown in FIG. 2, when flowing completely through the container structure 14 (generally understood as a "membrane-filtration or permeation"); as well as 2) over and around the exposed surfaces of mini-tubes 12 wall structure 12a, and also over exposed exterior and interior surfaces of various ones of the mini-tubes 12 if the mini-tubes have a toroidal or hollow tubular shape, as will be discussed below. In either event, the fluid flow 16 will flow through and around a plurality of the mini-tubes 12 when flowing completely through the container 14 (generally understood as "contact" filtration or flow, where contact filtration with exposed inner and/or outer surfaces of the mini-tube wall structures occurs); and 3) as well as in combinations of flow paths randomly both through and over inner and outer surfaces of the wall structure 12a various ones of the mini-tubes 12.

The container structure 14 may be formed of any suitable material, for example ceramic, glass, plastic, metal, etc. The container structure 14, while shown as having a generally square shape in FIG. 1, may be rectangular, cylindrical, spiral, star, hexagonal, or of any other cross sectional shape. The container structure 14 may have a length which forms a linear flow path, a non-linear flow path, a serpentine flow path, or virtually any other configuration, and the present disclosure is not limited to use of a container having any particular cross sectional shape or any type of configuration. The only requirements for the container structure 14 is that its input side 14a and output side 14b be constructed of a material, for example ceramic, glass, plastic, or metal, which permits a flow therethrough of the flowable medium being treated or filtered, while still being able to prevent the mini-tubes 12 from spilling out of the container structure. The container structure 14 may be made by any suitable method, but one specific method may be by additive manufacturing. For example, as a way to overcome manufacturing challenges of joining different parts of the container structure 14, 3D printing may be used to print the walls and floor of the container structure 14 together rather than welding or affixing them with fasteners or adhesives.

Figure 2:
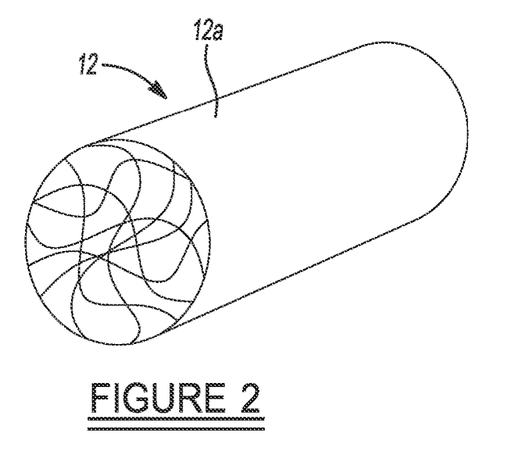
FIG. 2 illustrates one shape, that being cylindrical, that the mini-tube media (which may be for treatment or filtration) of the present disclosure and that may have nanofibrous or nanoporous microstructure, and can be prepared by methods such as electrospinning, extrusion, casting, and/or additive manufacturing (e.g., 3D printing)
Figure 3:
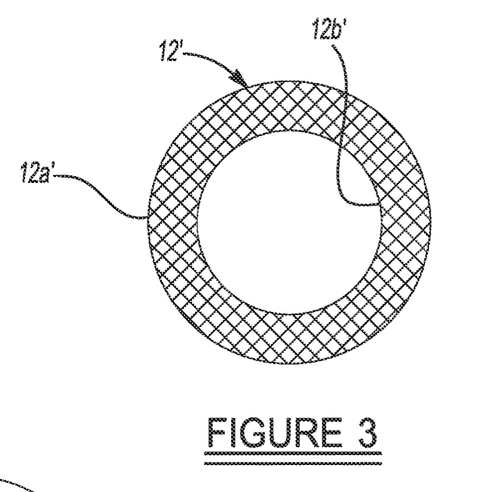
FIG. 3 illustrates another shape, that being toroidal, that the mini-tube media of the present disclosure and that may be of nanofibrous or nanoporous microstructure and prepared by methods such as electrospinning, extrusion, casting, and/or additive manufacturing (e.g., 3D printing)
Figure 4:
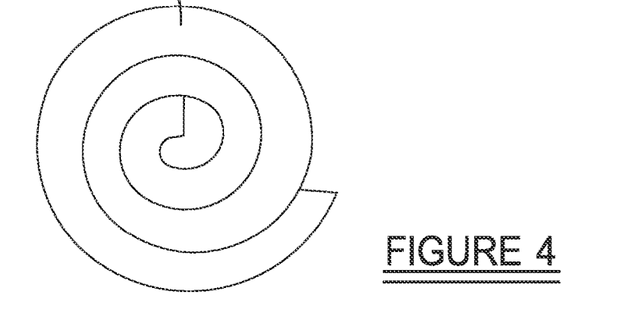
FIG. 4 illustrates an end view of yet another form that the mini-tube media may take, that being a rolled element, and the rolled element may have a nanofibrous or nanoporous microstructure and prepared by such methods as electrospinning, extrusion, casting, and/or additive manufacturing (e.g., 3D printing)

FIGS. 2-4 illustrate some examples of the different shapes that the mini-tubes 12 may take. The mini-tubes 12 are preferably made from ceramic and form a central feature of the present disclosure. The ceramics have nanofibrous or nanoporous microstructure and are prepared by methods such as, without limitation, electrospinning, extrusion, casting, and/or additive manufacturing (e.g., 3D printing). Ceramics may include oxides or non-oxide ceramics. Oxide ceramics and non-oxide ceramics may have insulating or conducting properties. The ceramic may be a catalyst. The ceramic may support a catalyst or reactant. Catalysts on the surfaces of the ceramic may include precious metal catalysts. Catalysts on the surfaces may be transition metal catalysts. Catalysts on the surface may be ceramic catalysts. Accordingly, at least some, or possibly all, of the mini-tubes 12 may have nanofibers with a functionalized surface, either due to the intrinsic functionality of the surface or due to extrinsic functionality added to the surface. In one embodiment the functionalized surface may be functionalized to support a catalyst. In one embodiment the functionalized surface is functionalized to capture an analyte. The mini tubes 12, 12' and 12" disclosed in FIGS. 2, 3 and 4, respectively, could also be made with glasses or metals.

While FIGS. 2, 3 and 4 illustrate specific examples of the shapes that the mini-tubes 12 may take, the construction of the mini-tubes is not limited to any one particular shape or configuration. FIG. 2 shows one of the mini-tubes 12 forming a hollow cylindrical component having an exterior wall surface 12a, while FIG. 3 shows a mini-tube 12' forming a toroidal element having a wall portion with both an exterior outer wall surface 12a' (representing a nominal inner diameter) and exterior inner wall surface 12b' (representing a nominal outer diameter), and where nanofibrous material of the wall portion may be partially randomly oriented or fully randomly oriented. FIG. 4 shows a mini-tube 12" having a rolled construction. Combinations of two or more different shapes of the mini-tubes 12 may also be used to form the filter pack 10, and different segments of the filter pack 10 could include different shapes of the mini-tubes 12. The mini-tubes 12 may also be formed with different lengths or cross-sectional dimensions and intermixed into the container structure 14. The mini-tubes 12 may also be of different material construction, sizes, shapes, and intermixed combinations of these previously described elements in a variety of ratios into the container structure based on properties that can be known to those skilled in the art of filtration, catalysis, or separations 14.

The creation of the ceramic mini-tubes 12 solves the shrinkage challenge that has been a longstanding challenge when attempting to form a filter media using ceramic nanofiber membranes. The mini-tubes 12 form a self-supporting geometry that can shrink freely during manufacture, without the constraint of a substrate that may cause tearing or cracking. The mini-tubes 12 also have better strength compared to a conventional membrane because of their geometry. In one embodiment the mini-tubes 12 may have a ring or toroidal structure such as that shown in FIG. 3, but which has been rolled, such as shown in FIG. 4. The rolled construction allows for even higher stresses before failure occurs. Compression is the most likely stress applicable to the ceramic mini-tube 12, whereas bending is the most likely stress applicable to a ceramic membrane if it is not supported on a substrate. Toroidal or other structures can be expected to impart greater compressive strength to the mini-tubes. It will also be appreciated that the compression strength of ceramics is systematically higher than the bending strength. The invention of the ceramic mini-tubes 12 solves the scaling to manufacturing challenge by scaling quantity (i.e., the number of individual mini-tubes 12 instead of the overall size and length of the media). The ceramic mini-tubes 12 can be of nanofibrous or nanoporous construction and prepared by methods including, but not necessarily limited to, electrospinning, extrusion, casting, and/or additive manufacturing (e.g., 3D printing).

Figure 5:
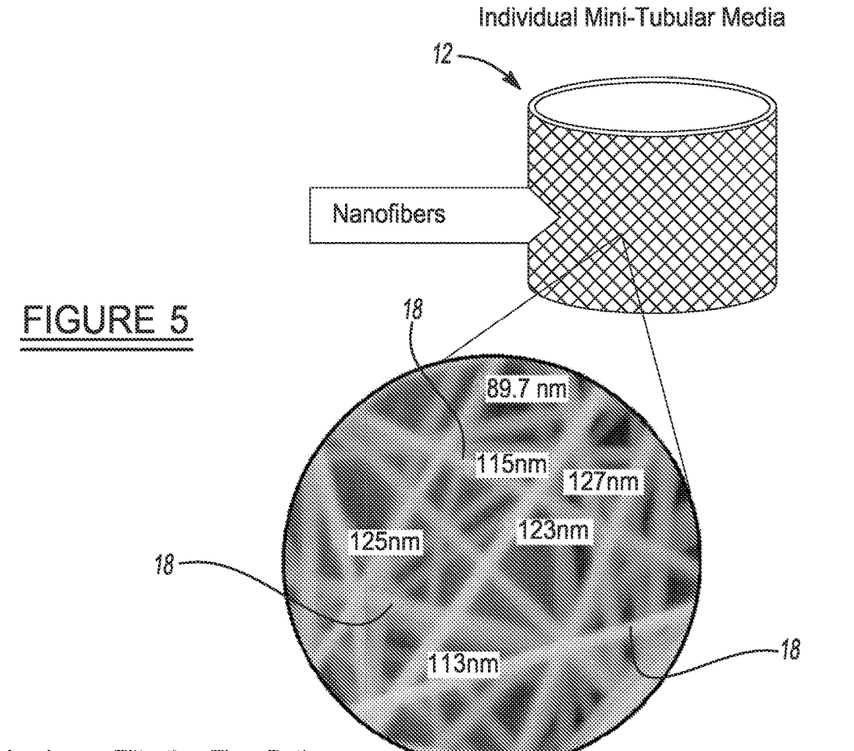
FIG. 5 shows a simplified illustration of the nanofibrous construction of one of the toroidal mini-tubes of the present disclosure that has a wall made out of nanofibers and has a hollow core.

Referring to FIG. 5, a highly magnified illustration of one of the mini-tubes 12 can be seen. The wall construction of the mini-tube 12 is made up of a large plurality of unwoven, arbitrarily oriented nanofibrous strands or fibers 18. The nanofibers 18 may also be in an aligned orientation.

Figures 6A, 6B:
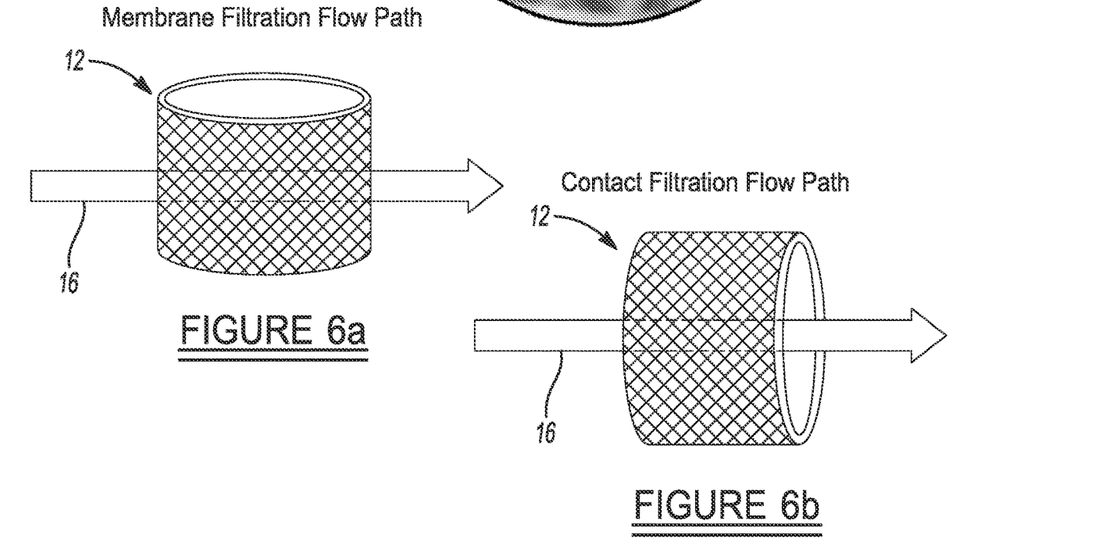
FIG. 6a shows a side view of one of the toroidal mini-tubes of the present disclosure illustrating flow through the full thickness of the mini-tube wall structure (i.e., through the membrane), and the mini-tube may have a nanofibrous or nanoporous microstructure and prepared by methods such as electrospinning, extrusion, casting, and/or additive manufacturing (e.g., 3D printing)
FIG. 6b shows a side view of the toroidal mini-tube of FIG. 6a but illustrating a contact filtration flow path where the flow is over, and in contact with, an inner surface of the wall structure inside the hollow core of the mini-tube, and the mini-tube may have a nanofibrous or nanoporous microstructure and prepared by methods such as electrospinning, extrusion, casting, and/or additive manufacturing (e.g., 3D printing)

FIGS. 6a and 6b depict the two different types of flow mechanisms through the mini tubes 12 in filter pack 10. FIG.

6a shows membrane permeation flow in which the fluid (e.g., air flow) 16 flows through the porous wall 12a of the mini-tube 12. FIG. 6b shows a contact flow where the fluid flow 16 flows over and in contact with the exterior and/or inner wall surface of the mini-tube 12. A hollow structure is an important feature that reduces pressure drop as demonstrated in FIG. 8 and FIG. 9.

Figure 7:
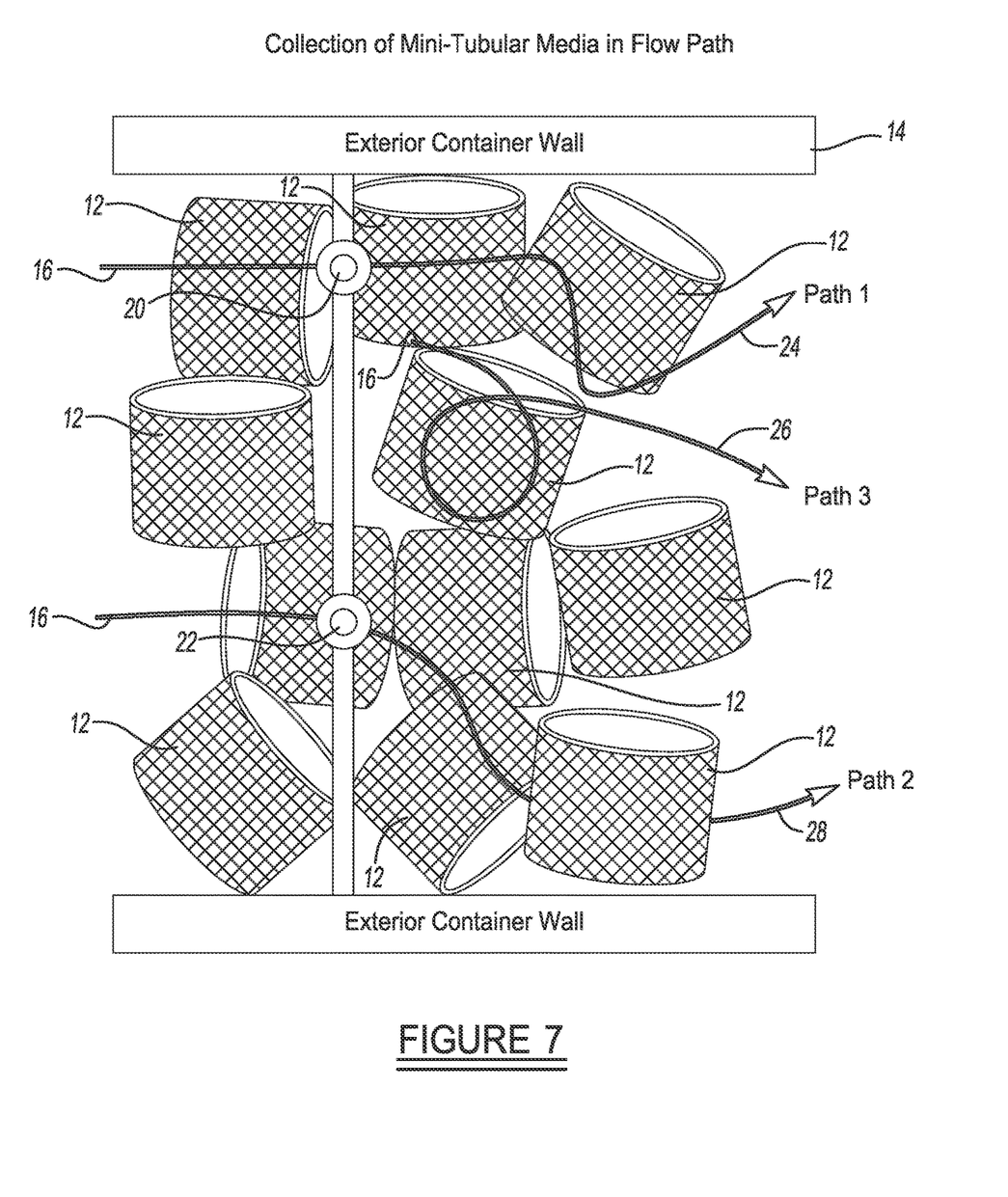
FIG. 7 is a simplified illustration of a collection of toroidal mini-tubes of the present disclosure illustrating how both membrane and contact flows occur, along with the formation of eddy flows that typically occur when a plurality of the mini-tubes are packed in random orientations, the mini-tube may have nanofibrous or nanoporous microstructure and prepared by methods such as electrospinning, extrusion, casting, and/or additive manufacturing (e.g., 3D printing)

FIG. 7 shows a further illustration of three distinct possible flow paths through the filter pack 10 mentioned above, where dots 20 and 22 represent a specific point in a cross section of the filter pack 10. The first flow path 24 represents fluid (e.g., air) flow 16 travelling through the mini-tube 12 porous wall at dot 20. The second flow path 28 illustrates fluid (e.g., air) flow 16 travelling through the hollow core of mini-tube 12 at dot 22, resulting in contact filtration. A combination of flow through the mini-tube 12 porous wall and contact flows at the same cross-section of the filter pack 10 provides a significant benefit in reducing the pressure drop ("dP") experienced by the fluid (e.g., air) flow. The third flow path 26 shows a contact flow extending over an inner surface of one of the mini tubes 12 because of a flow eddy caused by local pressure gradients that enhances the filtering action of the mini-tubes 12 on the fluid (e.g., air) flow 16. Because the third flow path 26 still traverses a mini-tube 12 porous wall, this movement over and in contact with the wall of the mini-tube 12 provides a filtering action on the air flow without creating a significant pressure drop on the air flow.

Figure 8:
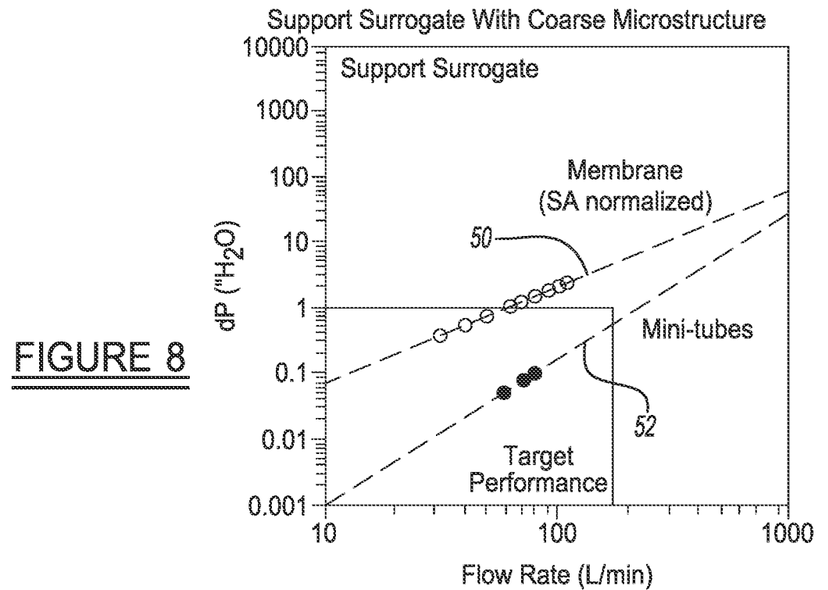
FIG. 8 shows a graph illustrating how the toroidal mini-tubes of the present disclosure produce a notable reduction in pressure drop ("dP") when compared to flow through a membrane of a support surrogate structure with a coarse microstructure and with the same total surface area.
Figure 9:
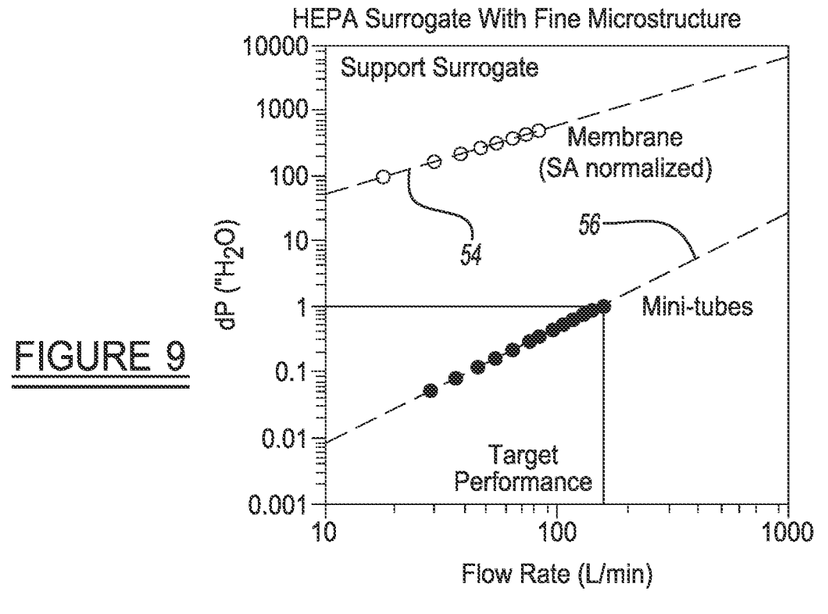
FIG. 9 shows a graph illustrating how the toroidal mini-tubes of the present disclosure produce a dramatic reduction in pressure drop as compared to flow through a membrane of a HEPA surrogate with fine microstructure and with the same total surface area.

While the mixed filtration represented by the first flow path 24 and second flow path 28 does introduce a pressure drop on the air flow, the hierarchical architectures that make up each of the mini-tubes 12 still enables the pressure drop to be dramatically reduced as compared with other types of membrane-like treatment media or filter media. Test results obtained by the co-inventors have demonstrated that using the mini-tubes 12 as filtration media in a flow stream reduced the pressure drop by an order of magnitude or more when compared to the pressure drop through a membrane of equivalent mass and surface area. This is illustrated in FIGS. 8 and 9. In FIG. 8, it can be seen that the mini-tubes 12 provide a significant reduction in pressure drop, represented by curve 52, when compared to a pressure drop of a membrane, represented by curve 50, for a support surrogate material having a relatively coarse microstructure. FIG. 9 shows the pressure drop of a HEPA filtration media surrogate in membrane form 54 with fine microstructure as compared to the mini-tubes 12 having a fine microstructure, represented by curve 56. Particularly in FIG. 9, it will be noted that the reduction in pressure drop produced by the mini-tubes 12 is on the order of about 1000 times that of the HEPA surrogate with fine microstructure at most flow rates.

Figure 9A:
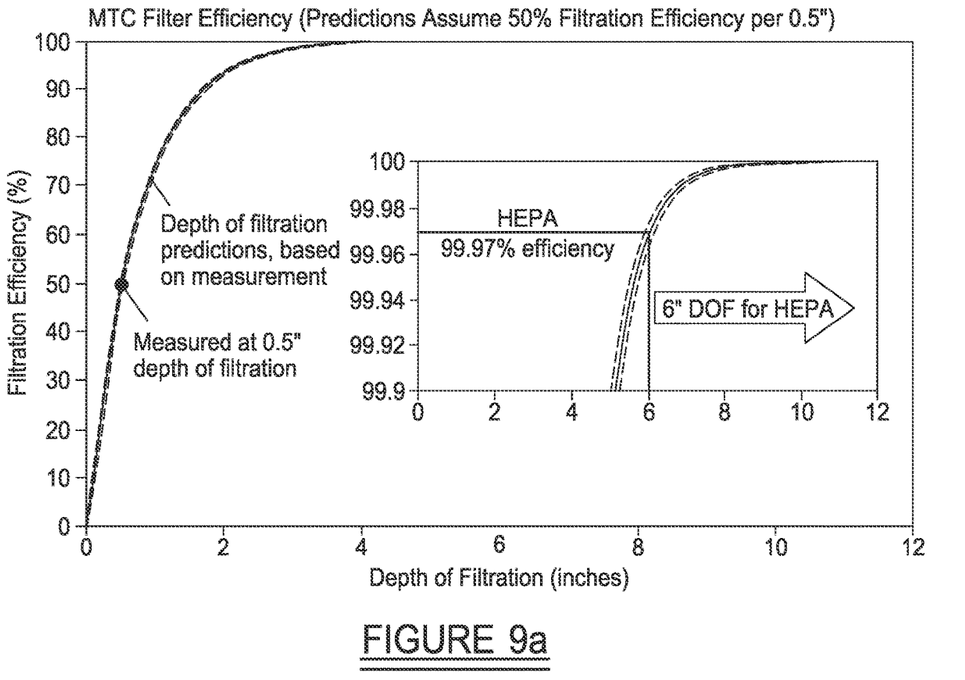
FIG. 9a shows graphs of MTC filter efficiency comprising test results collected at 0.5 inch depth of filtration, along with projections that suggest at least a 6 inch depth of filtration can potentially result in HEPA quality filtration.

In one real world application, for example retrofitting new filter technology into U.S. Department of Energy (DOE) nuclear facilities requires dP comparable to the current filters, which the ventilation systems were designed to accommodate. The mini-tubes 12 meet the target dP performance ($\leq 1$ $H_2O$ below 170 L/min in the allotted test volume), whereas the membranes filters do not. It is important to note that existing DOE nuclear, radiological, and biological facilities contain ventilation systems that utilize specific size filters. Filter packs made of elements (e.g., mini-tubes) can be made to fit into these specific sizes, thereby meeting spatial retrofitting requirements. Other approaches that do meet these spatial and dP requirements could require cost and schedule prohibitive modifications to existing DOE facilities. In FIG. 9a, a preliminary filter efficiency measurement made using a 0.5 inch depth of filtration (DOF) resulted in 50% removal efficiency of a dioctyl phthalate (DOP) aerosol. Assuming each additional 0.5 inch DOF removes 50% of the remaining DOP aerosol suggests that a DOF of at least 6 inches is required to remove 99.97% of the DOP aerosol and has the potential to fit within the spatial retrofitting requirements for HEPA filters.

It will be appreciated that the mixed-filtration mechanisms represented by flow path 28 (FIG. 7), as well as the dimensions of the mini tubes 12, can affect the filtration efficiency as well as the dP. Accordingly, these factors will need to be taken into consideration by the designer in balancing filtration efficiency with the minimum desired pressure drop.

Figure 10:
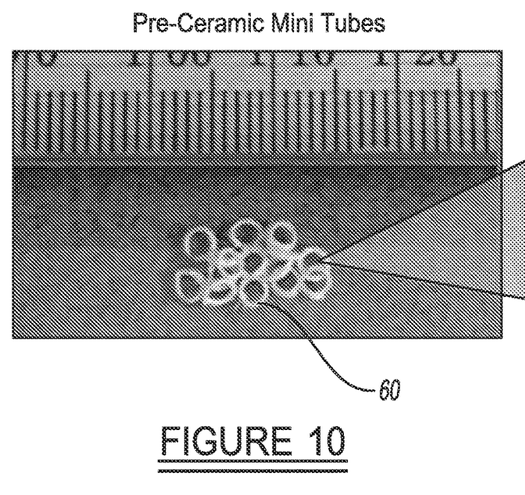
FIG. 10 is a picture of pre-ceramic toroidal mini-tubes in accordance with the present disclosure produced using an electrospinning process.
Figure 11:
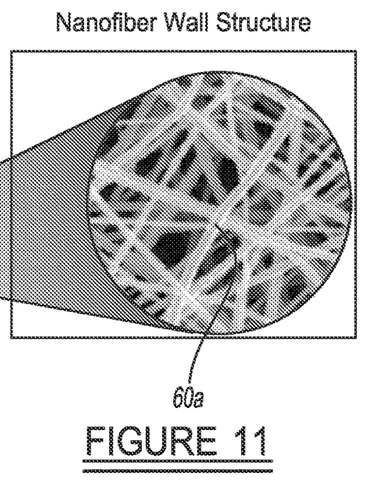
FIG. 11 shows a highly enlarged illustration of the nanofibrous structure of one of the toroidal mini-tubes of FIG. 10.

The present disclosure also discloses a new process for fabricating ceramic mini-tubes 12. Manufacturing of the ceramic mini-tubes 12 may be accomplished through the use of an electrospinning system, for example, but not limited to, the Fluidnatek LE10 system available from Bioinicia SL of Valencia, Spain, which may consist of a spinneret, where a precursor solution is emitted and becomes stretched into a fiber jet by an electric field. The fibers are deposited on a collector, which in one example may be a rotating mandrel, or optionally a rotating drum, or optionally a stationary flat plate. For convenience, the collector will be referred to in the following discussion as the "rotating mandrel" or simply "mandrel". The fibers are then removed as a fiber mat from the mandrel and formed into a shape to create the pre-ceramic mini-tubes 60 as shown in FIG. 10. The pre-ceramic mini-tubes 60 have a wall made of nanofibers 60a with textured microporosity and loaded with ceramic precursors, as better seen in FIG. 11. These nanofibers 18 (FIG. 5) and 60a (FIG. 11) typically may have a diameter in the range of 50 nm-200 nm. The fibers shrink during the ceramic conversion process (i.e., thermal treatment) and the ceramic nanofibers typically have a final diameter in the range of 50-100 nm. In this example, the ceramic mini-tubes 60 have a diameter of about 1-2 mm, a length of about 1.0-1.5 mm, a wall thickness of about 100 µm, pores about 1 µm in size, and a nanofiber structure with fiber diameters near 100 nm. These example dimensions apply as well to the various examples of the ceramic mini-tubes 12, 12' and 12" described in connection with FIGS. 2-4. The size features (ranging from 1 mm to 100 nm) cover five orders of magnitude. The co-inventors believe that an even more thorough understanding as to how filtration performance—dP and filtration efficiency—is affected by independent control of these different dimensional scales, may likely be gained with further research and experimentation. It will also be appreciated that the nanofibers can stay precursors and don't always have to be converted to a ceramic. Furthermore, the mandrel or mat may have a coating or layer (e.g., mylar sheet) that helps act as a release agent.

The manufacture of the mini-tubes 12 is not limited to electrospinning, but may also be achieved through extruding, casting, and/or additive manufacturing (e.g., projection microstereo-lithography (PµSL), and direct ink writing (DIW) (two forms of 3D printing). Furthermore, sacrificial template printing may also be used to help construct the mini-tubes 12. Sacrificial template printing is an additive manufacturing technique wherein an organic (e.g., polymer, resin) additive manufactured part is coated with a ceramic (e.g., dip-coating, plasma deposition, etc.) and then heat treated to fully or partially remove the organic.

The extrusion and casting methods of making the mini-tubes 12 are particularly advantageous as they represent existing commercial technology for ceramic manufacturing. With any of the above enumerated manufacturing approaches, the feedstock needs to be compatible with the selected approach. Direct ink writing ("DIW") is an additive manufacturing technique that facilitates customizable geometric design and enables the construction of the mini-tubes 12 as non-axisymmetric filtration media, which could be helpful for controlling the flow path through the filtration media. The electrospinning process discussed above produces a different hierarchical architecture (nanofibers create microporous channels), which can increase flow through the walls of the filtration media and thereby improve filtration efficiency.

It will also be appreciated that the term "ceramic" as used herein may mean "ceramic and/or ceramic composite" for the purposes of the present discussion. For example, using sacrificial 3D printing can leave some organic behind.

Important specific advantages of the present disclosure include the variety of different ceramic mini-tubes 12 that can be implemented into the filter pack 10, the useful properties of ceramics, the extremely high surface-to-volume ratio of the ceramic nanofibers 18 used to construct the mini-tubes 12, and the low pressure drop through the filter pack 10. The nanofiber forming process depends primarily on the polymer precursors rather than the ceramic precursors. Thus, a variety of ceramic precursors can be used in the process to synthesize a variety of ceramics. This enables tailoring the unique chemical, thermal, electrical, magnetic, and optical properties of the ceramic nanofibers for different applications of interest. The extremely high surface-to-volume ratio of ceramic nanofibers enables exposure to higher surface areas in a smaller volume, which is potentially useful for applications with physical space restrictions or that requires small treatment or filtering modules. The low pressure drop through the ceramic nanofiber media also ensure high energy efficiency associated with flowing fluid through the filter pack 10.

The geometry of the mini-tubes 12 is known to reduce pressure drop (dP) when compared to flow-through membranes of equivalent mass and surface area. This is evidenced by the graphs of FIGS. 8 and 9. A reduced dP facilitates retrofitting advanced filter packs 10 into existing systems and facilities, for example into U.S. Department of Energy facilities, to make them even safer while simultaneously reducing operational costs. The operation of a ventilation system is a key cost driver for many industries, and particularly with U.S. Department of Energy nuclear facilities. Reducing dP can significantly reduce the operational costs of an entity. Filter designs that can accommodate the same flow and pressure drop characteristics in a filter form factor that matches existing or established filter sizes provides for a significant cost savings in retrofitting improved mini-tube based filter technologies into the extensive quantity of existing buildings utilizing existing filter technology.

Another significant advantage of the ceramic mini-tubes 12, when constructed using electrospinning, is that the ceramic mini-tubes are thermally stable up to 850° C., or even higher temperatures depending on the ceramic material. This may lessen the need for elaborate fire suppression systems in some environments. It is well known that conventional HEPA filters using polymers for the filter medium, as well as in binders and seals, are highly susceptible to elevated temperature, fire and water damage, thus necessitating expensive installation, monitoring and maintenance of fire suppression systems to protect HEPA filters. Similarly, metal separators typically used in conventional HEPA filtering systems are susceptible to corrosion. Furthermore, disposal costs are a function of the lifetime of a filter, which may in turn be affected by exposure to moisture and/or corrosives. These drawbacks are not present with a ceramic filter pack 10 of the present disclosure.

Another embodiment is use of mini-tube sensors in the ceramic package. The nanofibrous mini-tube may be constructed of nanofiber sensors in individual strands of nanofiber sensors, or all strands include nanofiber sensors. The sensor could be made from any plurality of mini tubes. Different types of mini tube sensors may be included in the ceramic package. The sensors may provide feedback on the performance of the ceramic package or on analytes in the flow stream. Other ceramic sensor materials not made from nanofibers may also be included in the ceramic package.

Modular Ceramic Multi-Function Fluid Treatment Systems

In additional embodiments, the present disclosure further relates to embodiments of modular, ceramic multi-function fluid treatment systems and constructions. In these embodiments the ceramic substrates may have a specific macrostructure, microstructure, nanostructure, reactant, catalyst, and/or arrangement to control functionality of the substrate. Such functionality may include filtering, treating (e.g., with reactants and/or catalysts), intentionally directed flow paths, pressure drop control, adsorption and absorption capacity, mechanical support for thin ceramic membranes or multi-functional material properties, for example. Functionality also includes controlled shrinkage characteristics during a thermal cycle, which facilitates integrating a plurality of components in a modular fluid treatment configuration. Functionality may include the use of surface modifications that change the function of the surface, such as creating bonding or attachment sites for specificity or specific adsorption of a target material relative to other materials.

The various embodiments to be discussed below were invented in response to challenges in two different areas and combine the benefits of two or more manufacturing approaches. The challenges include 1) constrained shrinkage of ceramic nanofibers prepared by electrospinning that cause them to tear or break and 2) size/resolution and speed trade-offs and limitations of additive manufacturing. The present disclosure therefore relates to the synergistic use of electrospinning, additive manufacturing, and conventional processing together to construct fluid treatment systems and filters that mitigate challenges associated with the individual approaches, but that also add valuable functionality based on the benefits of each approach. Also realizing that scaling size of additively manufactured parts is often a challenge, the modular fluid treatment and filter systems of the present disclosure enable scaling of quantity to create systems having desired capabilities, as compared to directly scaling size in one single fluid treatment or filtering element. Functionality may include the use of surface modifications that change the function of the surface, such as creating bonding or attachment sites for specificity or specific adsorption of a target material relative to other materials.

The various embodiments discussed below are based on mesh-like or lattice-like substrates with a variety of mesh or lattice structures. These substrates can be, for example, polymer or polymer ceramic composites. Polymer substrates (e.g., produced by 3D printing) may be post-processed (e.g., coated with a ceramic slurry or plasma coated). Thermal treatments can be used to partially or fully decompose polymers in ceramic coated polymers or polymer/ceramic composites so that they become ceramic only. The ceramic may be partially sintered so that it retains a porous microstructure. The substrates may be coated with polymer nanofibers that contain ceramic precursors. One example after heat treatment is a mesh with porous ceramic struts that are also hollow where the polymer strut has been removed to reduce resistance to flow when integrated into a filter. Thermal treatments can convert the substrate and nanofibers to ceramic. The shrinkage of the substrate can be matched to the shrinkage of the nanofibers so that stress does not break the nanofiber coating. The meshes can be stacked, for example, in a tube to create a modular fluid treatment system or modular filter system. The meshes can be rotated relative to each other to control flow paths once stacked. The meshes can be tiled into larger panels of virtually any cross sectional size. These panels may be placed in a corrugated configuration or stacked to create a modular system of widely varying dimensions to meet the needs of a particular application. The meshes in a modular fluid treatment system or modular filter system can be all of the same type or they can be any number of different types.

While various types of printers may be utilized to construct the embodiments discussed herein, one particular 3D printer that is expected to prove valuable is the Connex 3 Object260 printer available from Stratsys of Eden Prairie, Minn. This printer can provide layer resolution from about 16-32 µm. However, the embodiments of the present disclosure are not limited to the production from only this specific model/make of printer, and it will be appreciated that other 3D printers may also prove suitable for the manufacture of the embodiments discussed herein.

Figure 12:
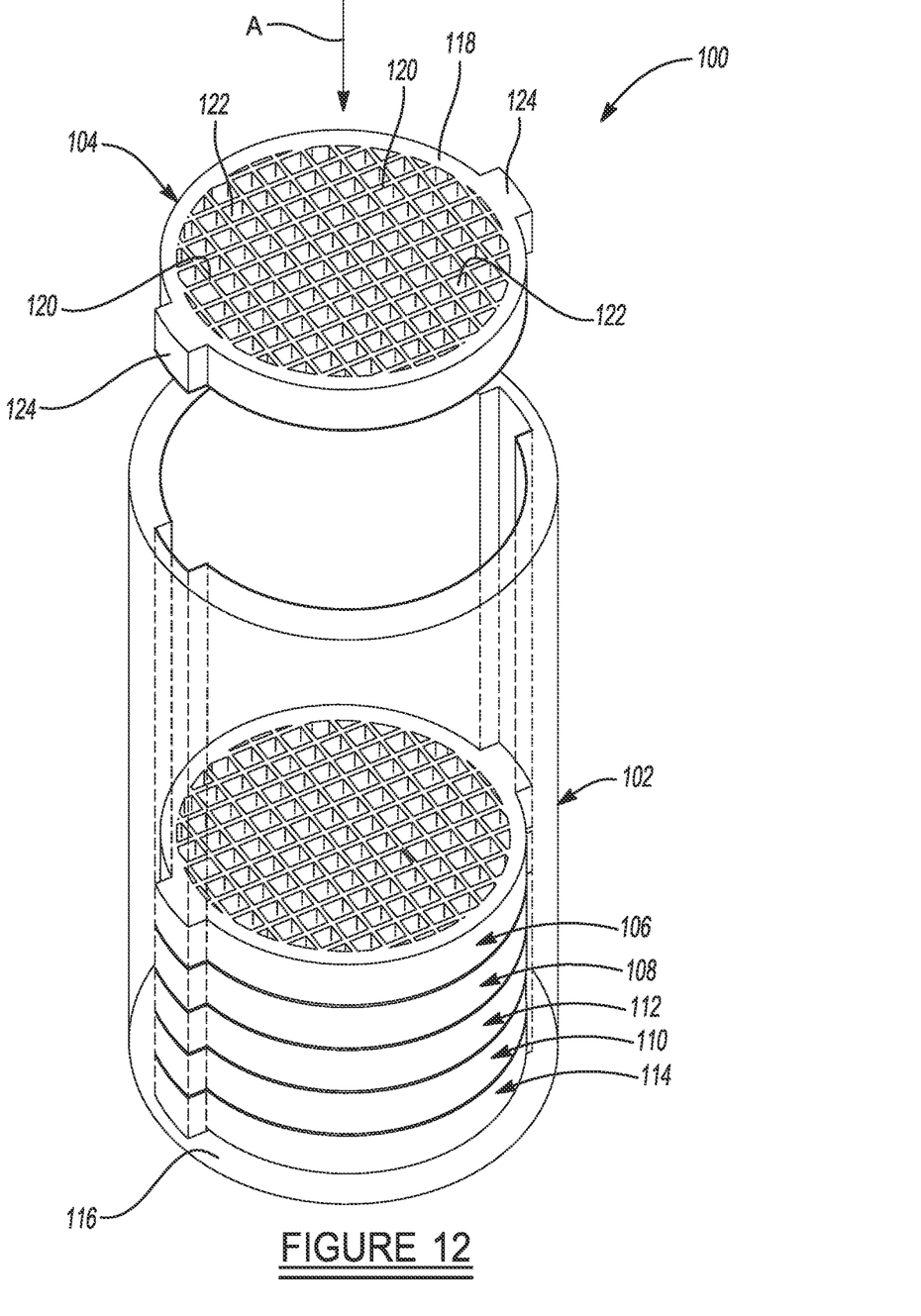
FIG. 12 shows another embodiment of the present disclosure which involves a modular fluid modification system having a plurality of non-randomly oriented and independently manufactured components or elements (which may include treatment, filtering, and/or sensors) held adjacent one another within a housing in desired angular orientations relative to one another, and furthermore which shows a nanofibrous or nanoporous media supported on a support structure (which may be produced by another method, e.g., electrospinning, casting, extrusion, or additive manufacturing)

One embodiment of a new modular layered fluid treatment system 100 in accordance with the present disclosure is shown in FIG. 12. The system 100 in this example comprises an outer tube 102, in this example a cylindrical tube, which houses a plurality of independent, disc-like fluid contacting elements 104, 106, 108, 110, 112 114 within the outer tube 102. For ease in illustrating and explaining the system 100, the outer tube 102 is shown transparently to illustrate the positioning of the fluid contacting elements 106-114 within the outer tube.

The outer tube 102 may include a cover or flange 116 at each end (only one being shown in FIG. 12) to retain the fluid contacting elements therein without impeding fluid flow into or out from the system 100. The outer tube 102 may be made from ceramic, metal, plastic or any other suitable material which is impervious to the fluid flowing through the system 100. While the outer tube 102 is shown having a cylindrical shape, the system 100 is not limited to this cross sectional shape, and in fact may use outer tubes having square, rectangular, pyramidal, hexagonal, pentagonal, or virtually any other cross sectional shape that meets the needs of a specific application. The overall length of the outer tube 102 and the number of independent fluid contacting elements housed therein will have a bearing on the efficiency and pressure drop that the fluid flow experiences, and as such these are design constraints that will be dictated by the needs of specific applications.

In the example of FIG. 12, the fluid contacting elements 104-114 are constructed generally identically to have a solid, impervious to fluid flow, outer frame portion 118, and a grid like structure of perpendicularly oriented wall portions 120 which define a plurality of small, square-shaped openings 122. The wall portions 120 may be formed (e.g., by 3D printing or other methods) to have a porous construction to increase the surface area of the fluid contacting element. It will be appreciated that the shape of the openings 122 need not be square shaped, and the precise shape of the openings 122 will depend on the how the wall portions 120 are arranged. Further, the wall portions 120 can be orientated parallel to the direction of fluid flow (defined by arrow "A") through the openings 122, or instead the wall portions 120 may be angled slightly non-parallel to the direction of fluid flow to increase the degree of impaction of particles entrained in a fluid with the wall portions 120 as the fluid flows through the fluid contacting element 104.

The openings 122 of each fluid contacting element 104-114 collectively form an orderly, grid-like arrangement of fluid flow paths which allow a fluid flow to pass through each of the fluid contacting elements 104-114. The dimensions of the openings 122 may vary considerably, but typically may be formed, for example, by using a suitable 3D printer with squares having dimensions on the order of 1-2 mm×1-2 mm or smaller, and a separation thickness (i.e., defined by walls 120 thickness) of 1 mm-2 mm or smaller. The resolution of the openings 122 may be limited by the particular printer or manufacturing technique used, as well as other factors. The size of the openings 122 and the thickness and porosity of the wall portions 120, which together control the surface area that the fluid flow "sees" as it flows through each fluid contacting element 104-114, will have a significant influence on the pressure drop experienced by a fluid flowing through the filter system 100. Accordingly, these are design variables that the designer needs to consider for each application.

The overall thickness of each fluid contacting element 104-114 may vary to suit the needs of a specific application, but may typically be about 1-10 mm, but as one specific example the fluid contacting elements 104-114 may each have a thickness of about 5 mm. As the fluid contacting element 104-114 is made thinner and thinner, the risk of bending or drooping of sections of the wall portions 120 may increase. And while the fluid contacting elements 104-114 are shown in FIG. 12 as all having the same overall thickness, with the same size openings 122 and the same wall 120 thicknesses, it will be appreciated that this is not absolutely necessary; certain ones of the elements 104-114 may have a greater or lesser overall thickness, and/or sized openings 122, and/or wall portion 120 thickness which is greater or lesser than the other ones of the elements. These variations may be used to control flow through the system 100 or for different filtration, separation, and/or reaction stages Referring further to FIG. 12, the outer frame portion 118 can be seen to include a pair of shoulder portions 124 arranged to project in radially opposite directions from one another. The shoulder portions 124 are shaped to fit within corresponding channels 126 on an inside surface 102a of the outer tube 102 and to hold the fluid contacting elements 104-114 against rotational movement once they are inserted in the outer tubing 102. Again, while two shoulder portions 124 and two channels 126 are shown, the fluid contacting elements 104-114 could each be constrained within the outer tube 102 using only a single shoulder 124 and a single channel 126. Conversely, the shoulder portions 124 could be formed to project from the interior wall 102a of the outer tube 102, while the fluid contacting elements 104-114 each include a selectively placed, complementary shaped channel or groove to engage with the shoulder portions, to thus hold the elements in a desired angular orientation within the outer tube. In either event, once each of the fluid contacting elements 104, 106, 108, 110, 112 and 114 is inserted into the outer tubing 102, each is held in a specific angular orientation within the outer tubing, and in a specific angular orientation relative to its adjacent element(s).

Referring further to FIG. 12, it can be seen that fluid contacting element 106 includes wall portions 120 which are formed at a different angular orientation than those of the element 104, relative to the orientation of its shoulder portions 124. Although the wall portions 120 of fluid contacting element 108 are not visible in FIG. 12, its wall portions are also formed at a different angular orientation from fluid contacting element 106. In one embodiment, the fluid contacting elements 104-114 are each formed with a predetermined angular "offset", for example about 5°-15°, so that once assembled into the outer housing 102, the element 106 will be angularly offset by a predetermined amount from the element 104, the element 108 will be angularly offset by the same amount from the element 106, and so forth for all the remaining fluid contacting elements 110-114. The selected angular offset creates a tortuous flow path throughout the system 100 and can be selected to tailor the fluid treating (e.g., filtering) capability (i.e., degrees of particle impaction, interception and diffusion) experienced by the particles, as well as the pressure drop of the system 100.

When laying out the grid pattern of the openings 122 in the fluid contacting elements 104-114, it will also be preferable to arrange the wall portions 120 such that wall portions are not oriented around the axial center of each element (i.e., such that a square shaped opening is not formed at the axial center of each fluid contacting element 104-114). This will eliminate creating a central opening straight through the entire length of the system 100.

Figure 13:
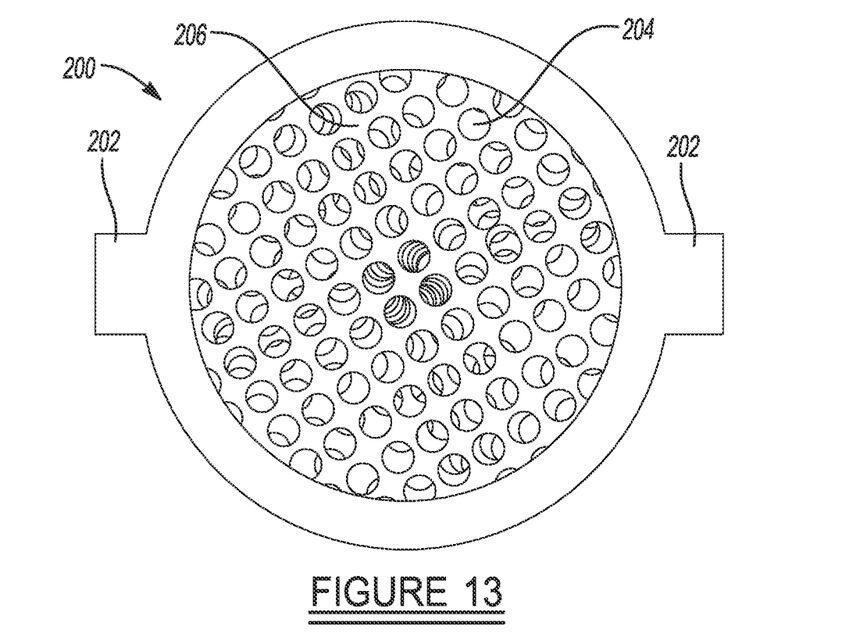
FIG. 13 shows another embodiment of the non-random elements in which there are circular openings with a selected degree of offset between each element.

Referring to FIG. 13, another embodiment of a fluid contacting element 200 is shown which incorporates radially opposing shoulder portions 202, and circular shaped openings 204 formed through the thickness of a wall 206 of the element 200. In this example the selected diameter of the circular shaped openings 204 may vary as needed to meet a specific application, but it is expected that for many applications a diameter of about 1 mm-5 mm or smaller will be suitable. It will also be understood that FIG. 13 illustrates a plurality of fluid contacting elements 200 stacked on top of one another. This creates openings 204 which are slightly angularly misaligned with one another, which has the effect of creating a continually helical flow vortex through the openings 204 when the elements 200 are installed adjacent one another in an outer tube, such as the outer tube 102 in FIG. 12. Again, the size of the circular openings 204 and the degree of offset selected may be varied to suit specific performance requirements. Preferably, the fluid contacting elements 200 are constructed so that each does not have a circular opening 204 at the axial center of the element, which avoids forming a straight path through all of the elements 200.

Referring further to FIG. 13, another embodiment may involve channels with the elements 200 that make up the overall fluid treatment or filter pack. In this embodiment, the respective openings of consecutive elements may be aligned to form channels that stay separate and/or intersect. Such channels may be lined with, composed of, or coated with, different catalysts or reactants.

Figure 14:
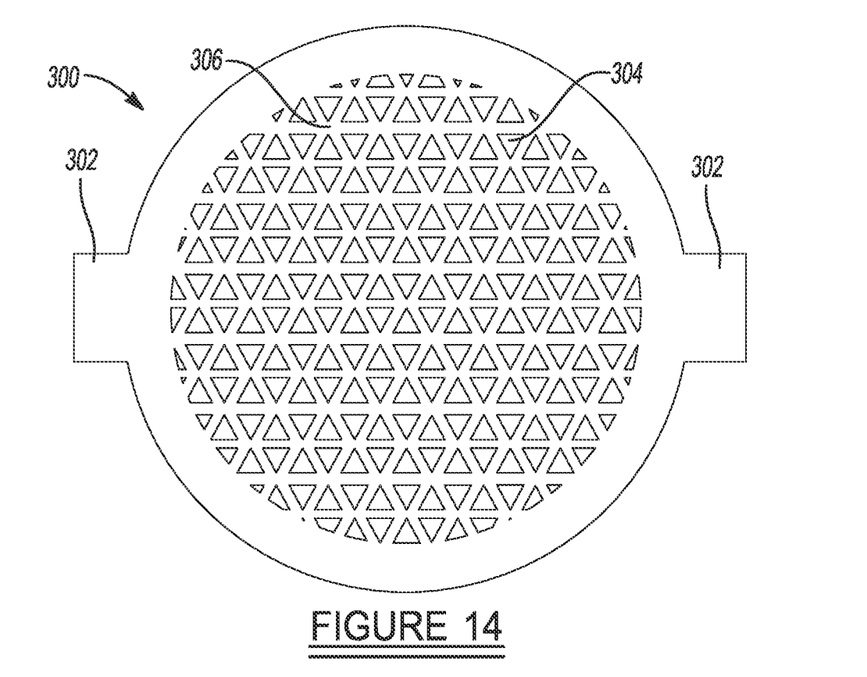
FIG. 14 shows still another embodiment of the non-random elements in which triangular shaped openings are used with a selected degree of offset.

FIG. 14 shows another embodiment of a fluid contacting element 300 of the present disclosure. The fluid contacting element 300 likewise includes shoulder portions 302 extending radially from one another, but instead of circular openings 204, the element 300 includes a surface 306 having triangular shaped openings 304. The triangular shaped openings 304 of two or more of the fluid contacting elements 300 may likewise be manufactured to be offset by a selected angle, which would create triangular shaped openings having gradually changing dimensions throughout the length of a plurality of adjacently mounted fluid contacting elements 300. The spacing of the triangular shaped openings 304, as well as the dimensions of the openings, may be varied as needed to suit specific performance requirements, but in one specific example the spacing may be between about 0.2 mm-1 mm or smaller, while the three sides of each of the triangular shaped openings 304 may typically be about 0.5 mm-4 mm in length or smaller.

While FIGS. 12-14 and the above discussion involve square, circular and pyramid shaped openings formed in the fluid contacting elements, it will be appreciated that the openings are not limited to only these shapes. Other shapes, for example possibly hexagonal, pentagonal, octagonal, rectangular, oval, just to name a few, may be used to form the openings in the fluid contacting elements. Even combinations of fluid contacting elements having different shaped and/or dimensioned openings may be used. A single element could also have a combination of openings with different shapes and sizes.

The modular construction of the system 100 and the various embodiments of the fluid contacting elements 106-144, 200 and 300 enable a fluid treatment (e.g., filtering) system to be modularly constructed that meets a wide range of performance requirements, and which can be easily modified if needed by adding, removing, or changing one or more fluid contacting elements. Importantly, the modular construction of the system 100, and the use of a plurality of fluid contacting elements, enables the manufacturing limitations of present day manufacturing systems (e.g., printing limitations of existing 3D printers) in producing larger sizes to be overcome by using a plurality of adjacently placed smaller fluid contacting elements. Similarly, the limitations of existing manufacturing approaches, including existing 3D printers, in printing or creating a part having overall length and width, or overall diameter limitations, may be overcome by using the above-described modular approach.

While the foregoing discussion has used 3D printing as one method for constructing the fluid contacting elements, it will be appreciated that the elements, as well as the outer tube for hold containing them, may be made by other methods, for example and without limitation, by extrusion, casting and/or electrospinning techniques, or possibly even combinations of these and other techniques.

The various embodiments of the fluid contacting elements described above, because of their modular construction, enable a wide variety of geometries to be formed besides just a tubular geometry shown in FIG. 12. For example, the fluid contacting elements may be arranged adjacent to one another (i.e., "tiled") in a common plane to form a much larger fluid contacting "sheet" that would otherwise not be capable of manufacture as a single unit because of present day limitations with 3D printing and other manufacturing techniques. The fluid contacting elements may also be stacked in different ways, or potentially arranged in distinct groups within interconnected housings that form a non-straight flow path.

The various embodiments of the present disclosure are expected to find utility in a wide range of applications, not just limited to fluid filtering applications, but potentially as fluid reactor systems as well. The various embodiments are expected to be used in a wide variety of settings such as industrial manufacturing facilities, assembly plants, in nuclear and/or chemical facilities, in energy producing facilities, possibly in urban environments such as in subway stations or like areas where clean air is desired but where air circulation may be limited, at street level areas where air quality may be compromised because of frequent vehicle traffic or other types of emissions from nearby facilities, at firing ranges (e.g., for removal of airborne lead particles), and in connection with water supplies that require filtration, just to name a few possible applications.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A modular fluid modification system comprising:
   an outer container configured to permit a fluid flow there into at a first location and to allow the fluid flow to exit the outer container at a second location spaced apart from the first location;
   a plurality of fluid contacting elements each forming an independent filtering or reactor element and housed adjacent one another in the outer container;
   each said fluid contacting element including a plurality of wall portions forming a plurality of openings, where the openings are formed in a grid or lattice-like pattern; and
   each one of said fluid contacting elements being independently insertable into the outer container to facilitate assembly, and removable from the outer container, and held within the outer container in a predetermined angular position relative to the outer container.

2. The system of claim 1, wherein the outer container holds the fluid contacting elements in at least one of:
   a parallel orientation wherein the fluid contacting elements are paneled adjacent one another; and
   a series orientation wherein the fluid contacting elements are arranged in a stacked configuration.

3. The system of claim 1, wherein at least of one the fluid contacting elements is produced by an additive manufacturing method.

4. The system of claim 1, wherein the wall portions of the fluid contacting elements each form struts, and wherein the struts are at least one of the following:
   nanoporous in construction;
   microporous in construction;
   hollow; or
   formed as a structural support for a secondary nanofibrous membrane.

5. The system of claim 4, wherein the fluid contacting elements are each formed as the structural support for an associated secondary nanofibrous membrane.

6. The system of claim 1, wherein at least two of the fluid contacting elements are:
   made from different materials; or
   perform separate functions; or
   when combined cooperate to add a different functionality not present from either one of the at least two fluid contacting elements when operating alone.

7. The system of claim 1, wherein each said fluid contacting element comprises an outer frame portion, with the grid of openings or lattice like structure formed within the outer frame portion; and wherein each one of the fluid contacting elements has cooperating structure, and wherein the cooperating structure includes one of a shoulder portion or a channel, and an inner surface of the outer container includes the other one of the shoulder portion or the channel, such that each said fluid contacting element is held in the outer container in the predetermined, angular position relative to the outer container.

8. The system of claim 7, wherein each said fluid contacting element is held in the outer container such that it is angularly offset from other immediately adjacently positioned ones of the fluid contacting elements, such that the openings of no two adjacent ones of the fluid contacting elements are in registration with one another.

9. The system of claim 8, wherein the openings of the fluid contacting elements are angularly offset from one another to create a continuous, helical flow vortex through the fluid contacting elements.

10. The system of claim 7, wherein an angular offset of any two adjacently positioned ones of the fluid contacting elements comprises an angular offset of between 5 degrees to 15 degrees.

11. The system of claim 1, wherein at least a subplurality of the plurality of openings are formed in at least one of:
 a square shape;
 a circular shape;
 a triangular shape;
 a pyramid shape;
 a hexagonal shape;
 an octagonal shape;
 a rectangular shape; or
 an oval shape.

12. The system of claim 1, wherein the openings comprise at least one of:
 square shaped openings having a dimension between about 1-2 mm by 1-2 mm; or
 circular openings having a diameter of openings having a diameter of 1 mm to 5 mm.

13. The system of claim 1, wherein the openings of different ones of the fluid contacting elements form openings having different shapes and/or sizes.

14. The system of claim 1, wherein each said fluid contacting element includes:
 an outer frame portion; and
 a plurality of wall portions forming the grid or lattice like structure within the outer frame portion.

15. The system of claim 14, wherein the wall portions are angled so as to be non-parallel to the outer frame portion.

16. A modular fluid modification system comprising:
 a tubular outer container, impervious to a fluid flow, and configured to permit the fluid flow into the tubular outer container at a first location and to allow the fluid flow to exit the tubular outer container at a second location spaced apart from the first location;
 a plurality of fluid contacting elements each forming an independent filtering or reactor element and housed adjacent one another in the tubular outer container;
 each said fluid contacting element including an outer frame portion within which is included a plurality of wall portions, the wall portions defining a plurality of openings arranged in a grid or lattice-like pattern;
 at least a subplurality of the wall portions being at least one of:
  nanoporous in construction;
  microporous in construction; or
  hollow in construction; and
 the tubular outer container and each one of the fluid contacting elements including cooperating structure to hold each said fluid contacting element in a predetermined angular position within the tubular outer container such that each pair of adjacent ones of the fluid contacting elements are angularly offset from one another by a predetermined degree to create non-straight flow paths through the openings in the wall portions of the fluid contacting elements; and
 the fluid contacting elements being configured to be independently insertable and removable into and out of the tubular outer container.

17. The system of claim 16, wherein the openings of the fluid contacting elements are angularly offset from one another to create a continuous, helical flow vortex through the fluid contacting elements.

18. The system of claim 16, wherein the fluid contacting elements form plate-like elements having a thickness of 1 mm to 10 mm; and
 wherein a subplurality of openings are formed in at least one of:
  a square shape;
  a circular shape;
  a triangular shape;
  a pyramid shape;
  a hexagonal shape;
  an octagonal shape;
  a rectangular shape; or
  an oval shape.

19. A modular fluid modification system comprising:
 an outer container configured to permit a fluid flow there into at a first location and to allow the fluid flow to exit the outer container at a second location spaced apart from the first location;
 a plurality of fluid contacting elements each forming an independent filtering or reactor element and housed adjacent one another in the outer container; and
 each said fluid contacting element including a plurality of wall portions forming a plurality of openings, where the openings are formed in a grid or lattice-like pattern; and
 wherein the openings of the fluid contacting elements are angularly offset from one another to create a continuous, helical flow vortex through the fluid contacting elements.

* * * * *